United States Patent [19]

Swayney et al.

[11] Patent Number: 5,743,074
[45] Date of Patent: Apr. 28, 1998

[54] LAWN MOWER DECK PROTECTING DEVICE

[76] Inventors: Ernest Edward Swayney; Norman Frank Jones, both of 1507 Glassell St.; Christopher Joseph Parker, 1218 Carmel Dr., all of Simi Valley, Calif. 93065

[21] Appl. No.: 631,978

[22] Filed: Apr. 15, 1996

[51] Int. Cl.[6] .................................................. A01D 67/00
[52] U.S. Cl. .................... 56/17.4; 56/320.1; 56/DIG. 20; 56/DIG. 24
[58] Field of Search ........................... 56/320.1, 320.2, 56/17.4, 16.7, DIG. 9, DIG. 20, DIG. 24

[56] References Cited

U.S. PATENT DOCUMENTS

| 2,523,640 | 9/1950 | Zipf | 56/320.1 |
| 4,107,907 | 8/1978 | Rutherford | 56/320.2 |
| 4,172,351 | 10/1979 | Scanland | 56/320.1 |
| 4,277,937 | 7/1981 | Luick | 56/17.4 X |

Primary Examiner—Terry Lee Melius
Assistant Examiner—Heather Shackelford

[57] ABSTRACT

A lawn mower deck protecting device including a lawn mower deck mounting portion comprised of a right side brace and a left side brace secured to the deck of the lawn mower. A stress bar couples with a handle of the lawn mower and the right side brace of the lawn mower deck mounting portion.

8 Claims, 3 Drawing Sheets

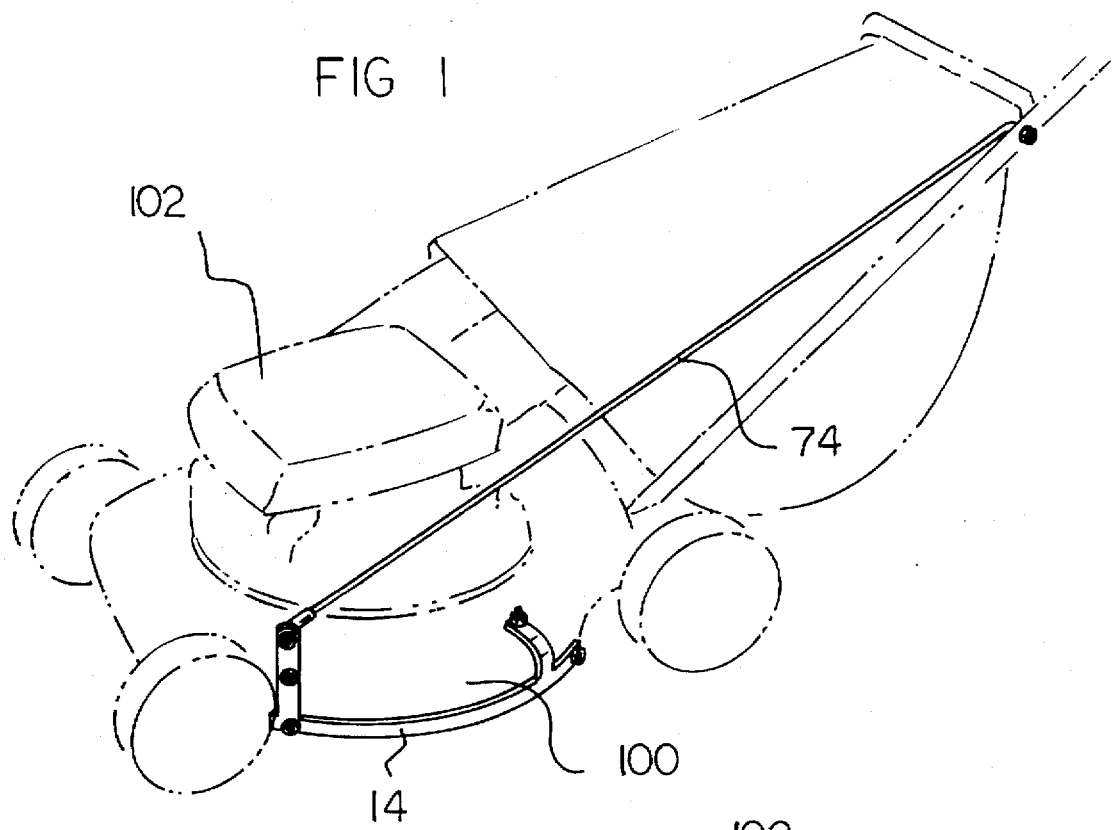
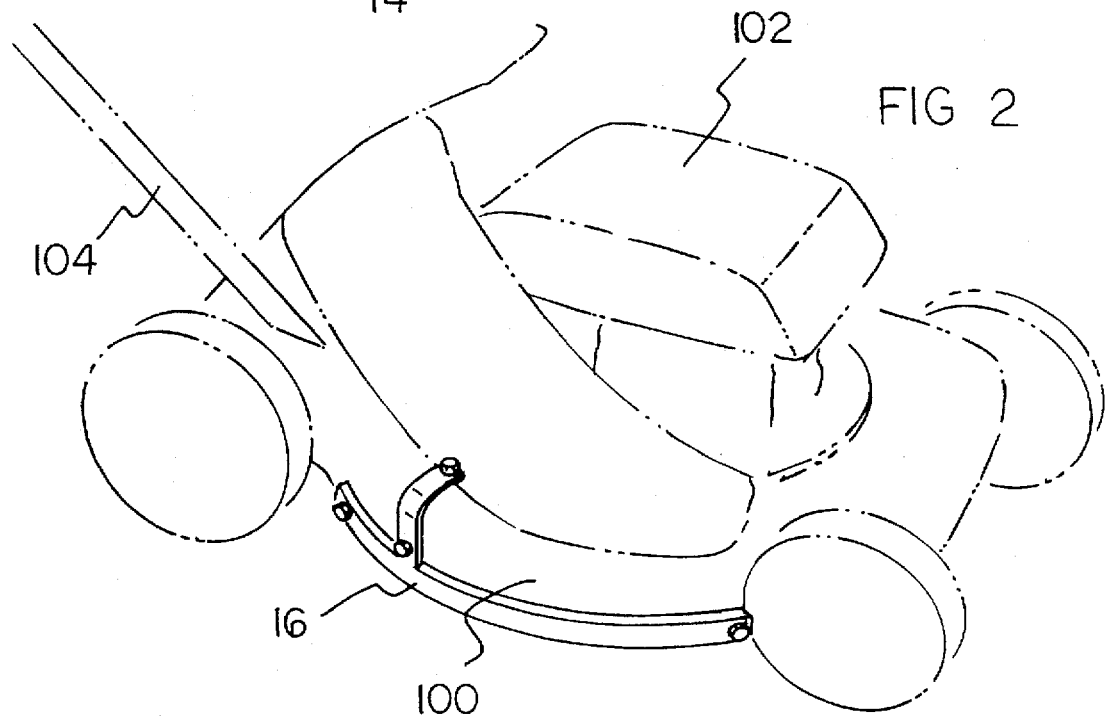

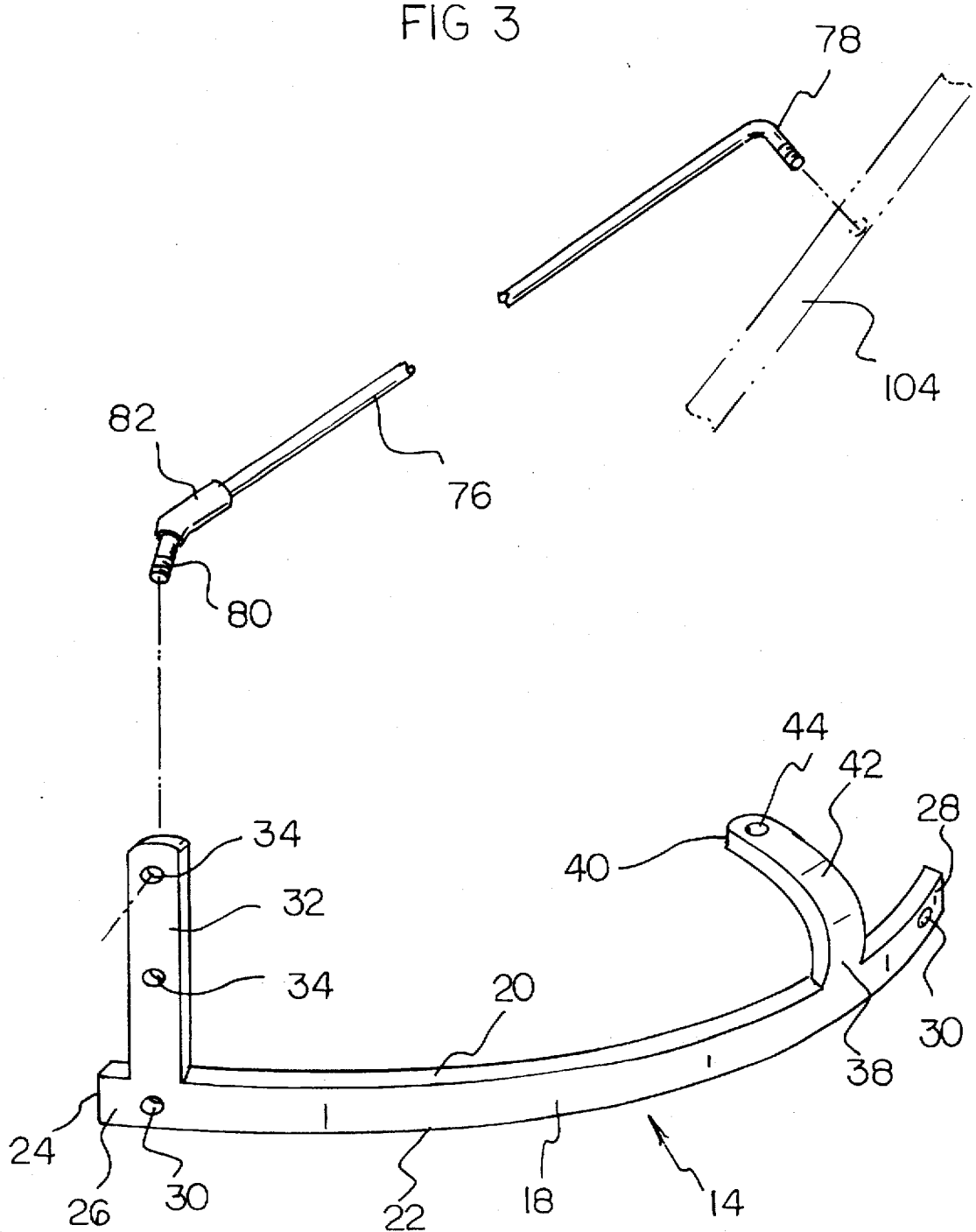

5,743,074

LAWN MOWER DECK PROTECTING DEVICE

BACKGROUND OF THE INVENTION

1. Field of the Invention

The present invention relates to a lawn mower deck protecting device and more particularly pertains to protecting the deck from wear and tear from mowing lawns with a lawn mower deck protecting device.

2. Description of the Prior Art

The use of lawn mower guards is known in the prior art. More specifically, lawn mower guards heretofore devised and utilized for the purpose of providing a means of protection to a person mowing are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,172,351 to Scanland discloses a safety shield construction for rotary mower.

U.S. Pat. No. 4,942,726 to Bowditch discloses a mechanism and method for converting a fixed wheel walk-behind mower to a caster wheel walk-behind mower and vice versa.

U.S. Pat. No. 4,996,832 to McKeever discloses a side guard for rotary lawn mower.

U.S. Pat. No. 4,300,334 to Hines discloses power rake foot guard.

U.S. Pat. No. 3,909,053 to Koch discloses a side fender.

While these devices fulfill their respective, particular objective and requirements, the aforementioned patents do not describe a lawn mower deck protecting device for protecting the deck from wear and tear from mowing lawns.

In this respect, the lawn mower deck protecting device according to the present invention substantially departs from the conventional concepts and designs of the prior art, and in doing so provides an apparatus primarily developed for the purpose of protecting the deck from wear and tear from mowing lawns.

Therefore, it can be appreciated that there exists a continuing need for new and improved lawn mower deck protecting device which can be used for protecting the deck from wear and tear from mowing lawns. In this regard, the present invention substantially fulfills this need.

SUMMARY OF THE INVENTION

In the view of the foregoing disadvantages inherent in the known types of lawn mower guards now present in the prior art, the present invention provides an improved lawn mower deck protecting device. As such, the general purpose of the present invention, which will be described subsequently in greater detail, is to provide a new and improved lawn mower deck protecting device and method which has all the advantages of the prior art and none of the disadvantages.

To attain this, the present invention essentially comprises a lawn mower deck mounting portion comprised of a right side brace and a left side brace. The right side brace has an elongated and arcuate member corresponding with a curved side portion of a deck of a lawn mower. The elongated and arcuate member has planar upper, lower and side edges. The elongated and arcuate member has a first end portion and a second end portion each having an aperture therethrough. A mounting tab extends upwardly from the upper edge of the elongated and arcuate member at the first end portion thereof. The mounting tab has a plurality of apertures therethrough. A coupling bracket extends upwardly from the upper edge of the elongated and arcuate member inwardly of the second end portion thereof. The coupling bracket has a first end, a second end and an intermediate bend therebetween. The first end is integral with the upper edge of the elongated and arcuate member. The second end has an aperture therethrough. The intermediate bend orients the second end in an essentially orthogonal orientation with the first end. The left side brace has an elongated and arcuate member corresponding with an opposing curved side portion of the deck of the lawn mower. The elongated and arcuate member has planar upper, lower and side edges. The elongated and arcuate member has a first end portion and a second end portion each having an aperture therethrough. A coupling bracket extends upwardly from the upper edge of the elongated and arcuate member inwardly of the second end portion thereof. The coupling bracket has a first end, a second end and an intermediate bend therebetween. The first end is integral with the upper edge of the elongated and arcuate member. The second end has an aperture therethrough. The intermediate bend orients the second end in an essentially orthogonal orientation with the first end. The device includes a stress bar comprised of a linear main member having an orthogonally oriented upper end portion and an angularly oriented lower end portion. The upper end portion couples with a handle of the lawn mower. The lower end portion selectively couples with one of the plurality of apertures of the mounting tab of the right side brace.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mower deck protecting device which has all the advantages of the prior art lawn mower guards and none of the disadvantages.

It is another object of the present invention to provide a new and improved lawn mower deck protecting device which may be easily and efficiently manufactured and marketed.

It is a further object of the present invention to provide a new and improved lawn mower deck protecting device which is of durable and reliable construction.

An even further object of the present invention is to provide a new and improved lawn mower deck protecting device which is susceptible of a low cost of manufacture with regard to both materials and labor, and which accordingly is then susceptible of low prices of sale to the consuming public, thereby making such a lawn mower deck protecting device economically available to the buying public.

Still yet another object of the present invention is to provide a new and improved lawn mower deck protecting device which provides in the apparatuses and methods of the prior art some of the advantages thereof, while simultaneously overcoming some of the disadvantages normally associated therewith.

Even still another object of the present invention is to provide a new and improved lawn mower deck protecting device for protecting the deck from wear and tear from mowing lawns.

Lastly, it is an object of the present invention to provide a new and improved lawn mower deck protecting device including a lawn mower deck mounting portion comprised of a right side brace and a left side brace secured to the deck of the lawn mower. A stress bar couples with a handle of the lawn mower and the right side brace of the lawn mower deck mounting portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the lawn mower deck protecting device constructed in accordance with the principles of the present invention.

FIG. 2 is a perspective view of an opposing side of the present invention.

FIG. 3 is an exploded side view of the present invention.

The same reference numerals refer to the same parts through the various Figures.

DESCRIPTION OF THE PREFERRED EMBODIMENT

Figure 4:
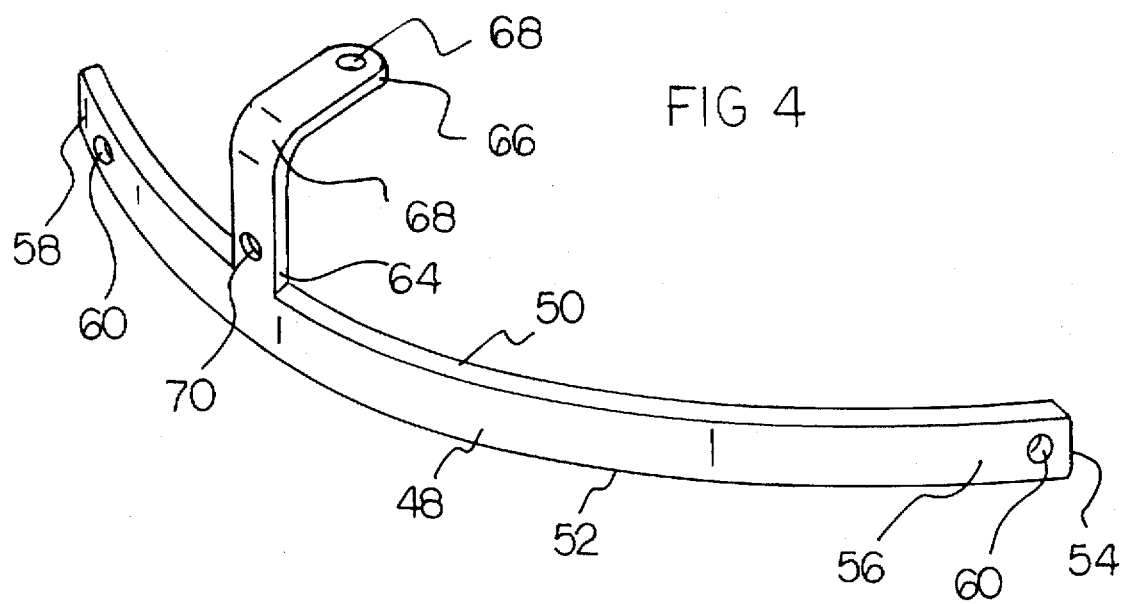
FIG. 4 is a side view of the right side brace of the present invention.
Figure 5:
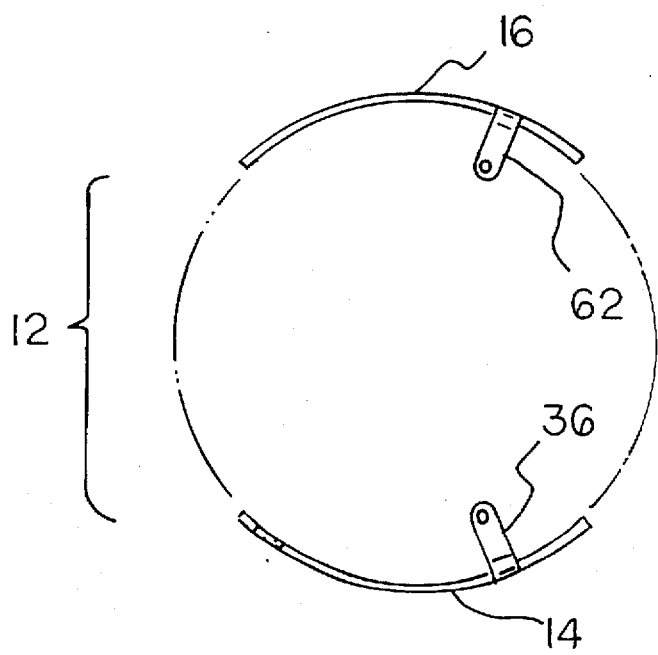
FIG. 5 is a plan view of the right side brace and left side brace of the present invention.

With reference now to the drawings, and in particular, to FIGS. 1-5 thereof, the preferred embodiment of the new and improved lawn mower deck protecting device embodying the principles and concepts of the present invention and generally designated by the reference number 10 will be described.

Specifically, it will be noted in the various Figures that the device relates to a lawn mower deck protecting device for protecting the deck from wear and tear from mowing lawns. In its broadest context, the device consists of a lawn mower deck mounting portion and a stress bar. Such components are individually configured and correlated with respect to each other so as to attain the desired objective.

The device 10 includes a lawn mower deck mounting portion 12 comprised of a right side brace 14 and a left side brace 16. The right side brace 14 has an elongated and arcuate member 18 corresponding with a curved side portion of a deck 102 of a lawn mower. Note FIG. 1. The elongated and arcuate member 18 has planar upper 20, lower 22 and side edges 24. The elongated and arcuate member 18 has a first end portion 26 and a second end portion 28 each having an aperture 30 therethrough. The apertures 30 allow for the right side brace 14 to be secured to the deck 100 by mounting nuts and bolts. A mounting tab 32 extends upwardly from the upper edge 20 of the elongated and arcuate member 18 at the first end portion 26 thereof. The mounting tab 32 has a plurality of apertures 34 therethrough. The mounting tab 32 is essentially perpendicular with the upper edge 20. A coupling bracket 36 extends upwardly from the upper edge 20 of the elongated and arcuate member 18 inwardly of the second end portion 28 thereof. The coupling bracket 36 has a first end 38, a second end 40 and an intermediate bend 42 therebetween. The first end 38 is integral with the upper edge 20 of the elongated and arcuate member 18. The second end 40 has an aperture 44 therethrough. The intermediate bend 42 orients the second end 40 in an essentially orthogonal orientation with the first end 38. The aperture 44 allows for further securement of the right side brace 14 to the deck 100 of the lawn mower 102 by a nut and bolt through an upper surface of the deck 100.

Associated with the right side brace 14 is the left side brace 16. The left side brace 16 has an elongated and arcuate member 48 corresponding with an opposing curved side portion of the deck 100 of the lawn mower 100. Note FIG. 2. The elongated and arcuate members 18,48 of the right an left side braces 14,16 are of identical dimensions. The elongated and arcuate member 48 has planar upper 50, lower 52 and side edges 54. The elongated and arcuate member 48 has a first end portion 56 and a second end portion 58 each having an aperture 60 therethrough. The apertures 60 allow for the left side brace 16 to be secured to the deck 100 by mounting nuts and bolts. A coupling bracket 62 extends upwardly from the upper edge 50 of the elongated and arcuate member 48 inwardly of the second end portion 58 thereof. The coupling bracket 62 has a first end 64, a second end 66 and an intermediate bend 68 therebetween. The first end 64 is integral with the upper edge 50 of the elongated and arcuate member 50. The second end 66 has an aperture 68 therethrough. The first end having an aperture 70 therethrough. The apertures 68,70 allow for further securement of the left side brace 16 to the deck 100 of the lawn mower 102. The intermediate bend 68 orients the second end 66 in an essentially orthogonal orientation with the first end 64.

The lawn mower deck mounting portion 12 is designed to extend the life of the deck 100 of the lawn mower 102. The various apertures of the lawn mower deck mounting portion 12 align with existing apertures on the deck 100 to allow for easy securement of the device 10 thereto.

The device 10 also includes a stress bar 74 comprised of a linear main member 76 having an orthogonally oriented upper end portion 78 and an angularly oriented lower end portion 80. Note FIG. 3. The upper end portion 78 couples with a handle 104 of the lawn mower 102. The lower end portion 80 selectively couples with one of the plurality of apertures 34 of the mounting tab 32 of the right side brace 14. A collar 82 is secured inwardly of the angularly oriented lower end portion 80 thereby preventing outwardly sliding of the lower end portion 80 relative to the mounting tab 32. The upper and lower end portions 78,80 are threaded thereby allowing for coupling with nuts.

The stress bar 74 limits the pushing force the handle 104 causes as it pushes forward on the deck 100. This pushing force is a primary reason for cracking of the deck 100.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A lawn mower deck protecting device for protecting the deck from wear and tear from mowing lawns comprising, in combination:

a lawn mower deck mounting portion comprised of a right side brace and a left side brace:

the right side brace having an elongated and arcuate member, the elongated and arcuate member adapted for coupling with a curved side portion of a deck of a lawn mower, the elongated and arcuate member having planar upper, lower and side edges, the elongated and arcuate member having a first end portion and a second end portion each having an aperture therethrough, a mounting tab extending upwardly from the upper edge of the elongated and arcuate member at the first end portion thereof, the mounting tab having a plurality of apertures therethrough, a coupling bracket extending upwardly from the upper edge of the elongated and arcuate member inwardly of the second end portion thereof, the coupling bracket having a first end, a second end and an intermediate bend therebetween, the first end integral with the upper edge of the elongated and arcuate member, the second end having an aperture therethrough, the intermediate bend orienting the second end in an essentially orthogonal orientation with the first end, the left side brace having an elongated and arcuate member, the elongated and arcuate member adapted for coupling with an opposing curved side portion of the deck of the lawn mower, the elongated and arcuate member having planar upper, lower and side edges, the elongated and arcuate member having a first end portion and a second end portion each having an aperture therethrough, a coupling bracket extending upwardly from the upper edge of the elongated and arcuate member inwardly of the second end portion thereof, the coupling bracket having a first end, a second end and an intermediate bend therebetween, the first end integral with the upper edge of the elongated and arcuate member, the second end having an aperture therethrough, the intermediate bend orienting the second end in an essentially orthogonal orientation with the first end;

an elongated bar comprised of a linear main member, the elongated bar having an upper end portion being orthogonally oriented with respect to the main member and a lower end portion being angularly oriented with respect to the main member, the upper end portion adapted for coupling with a handle of a lawn mower, the lower end portion selectively coupling with one of the plurality of apertures of the mounting tab of the right side brace.

2. A lawn mower deck protecting device comprising:

a lawn mower deck mounting portion comprised of a right side brace and a left side brace;

an elongated bar adapted for direct coupling with a handle of the lawn mower and the right side brace of a lawn mower deck mounting portion.

3. The device as set forth in claim 2 wherein the right side brace having an elongated and arcuate member, the elongated and arcuate member adapted for coupling with a curved side portion of a deck of a lawn mower, the elongated and arcuate member having planar upper, lower and side edges, the elongated and arcuate member having a first end portion and a second end portion each having an aperture therethrough.

4. The device as set forth in claim 3 and further including a mounting tab extending upwardly from the upper edge of the elongated and arcuate member at the first end portion thereof, the mounting tab having a plurality of apertures therethrough for selective coupling with the stress bar.

5. The device as set forth in claim 3 and further including a coupling bracket extending upwardly from the upper edge of the elongated and arcuate member inwardly of the second end portion thereof, the coupling bracket having a first end, a second end and an intermediate bend therebetween, the first end integral with the upper edge of the elongated and arcuate member, the second end having an aperture therethrough, the intermediate bend orienting the second end in an essentially orthogonal orientation with the first end.

6. The device as set forth in claim 2 wherein the left side brace having an elongated and arcuate member, the elongated and arcuate member adapted for coupling with an opposing curved side portion of the deck of the lawn mower, the elongated and arcuate member having planar upper, lower and side edges, the elongated and arcuate member having a first end portion and a second end portion each having an aperture therethrough.

7. The device as set forth in claim 6 and further including a coupling bracket extending upwardly from the upper edge of the elongated and arcuate member inwardly of the second end portion thereof, the coupling bracket having a first end, a second end and an intermediate bend therebetween, the first end integral with the upper edge of the elongated and arcuate member, the second end having an aperture therethrough, the intermediate bend orienting the second end in an essentially orthogonal orientation with the first end.

8. The device as set forth in claim 2 wherein the elongated bar comprised of a linear main member, the elongated bar having an upper end portion being orthogonally oriented with respect to the main member and a lower end portion being angularly oriented with respect to the main member, the upper end portion adapted for coupling with a handle of a lawn mower, the lower end portion selectively coupling with one of the right side brace of the lawn mower deck mounting portion.

* * * * *